(12) United States Patent
Abe et al.

(10) Patent No.: US 8,785,050 B2
(45) Date of Patent: Jul. 22, 2014

(54) LITHIUM ION SECONDARY BATTERY

(75) Inventors: Takeshi Abe, Toyota (JP); Yohei Shindo, Toyota (JP); Akira Tsujiko, Toyota (JP); Machiko Abe, Toyota (JP); Keiko Wasada, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 13/813,458

(22) PCT Filed: Aug. 5, 2010

(86) PCT No.: PCT/JP2010/063281
§ 371 (c)(1),
(2), (4) Date: Jan. 31, 2013

(87) PCT Pub. No.: WO2012/017537
PCT Pub. Date: Feb. 9, 2012

(65) Prior Publication Data
US 2013/0130121 A1 May 23, 2013

(51) Int. Cl.
*H01M 4/13* (2010.01)
(52) U.S. Cl.
USPC ........................................................ 429/231.8
(58) Field of Classification Search
None
See application file for complete search history.

(56) References Cited

U.S. PATENT DOCUMENTS

| | | | | |
|---|---|---|---|---|
| 2004/0115117 A1* | 6/2004 | Takei et al. | .................. | 423/448 |
| 2004/0158550 A1* | 8/2004 | Jardin | ................................ | 707/2 |
| 2005/0158550 A1* | 7/2005 | Ohta et al. | ..................... | 428/407 |
| 2013/0065138 A1* | 3/2013 | Takahata et al. | ............. | 429/338 |

FOREIGN PATENT DOCUMENTS

| | | |
|---|---|---|
| JP | 6-318459 | 11/1994 |
| JP | 7-235294 | 9/1995 |
| JP | 2002-175810 | 6/2002 |
| JP | 2002-313321 | 10/2002 |
| JP | 2004-63321 | 2/2004 |
| JP | 2007-95402 | 4/2007 |
| JP | 2007-141677 | 6/2007 |
| JP | 2007-157538 | 6/2007 |
| JP | 2008-10316 | 1/2008 |
| JP | 2009-129769 | 6/2009 |

OTHER PUBLICATIONS

Honbo et al., Electrochemical properties and Li deposition morphologies of surface modified graphite after grinding, Journal of Power Sources 189 (2009) 337-343, Available online Aug. 27, 2008.*

* cited by examiner

*Primary Examiner* — Patrick Ryan
*Assistant Examiner* — Jose Colucci Rios
(74) *Attorney, Agent, or Firm* — Finnegan, Henderson, Farabow, Garrett & Dunner, LLP

(57) ABSTRACT

Provided is a lithium-ion secondary battery having an excellent initial capacity as well as a good capacity retention rate. The battery comprises a positive electrode comprising a positive electrode active material, a negative electrode comprising a negative electrode active material, and a non-aqueous liquid electrolyte. The negative electrode active material comprises a graphitic material that satisfies each of the following properties: (a) in its Raman spectrum obtained by Raman scattering analysis using an exciting light at a wavelength of 532 nm, having a ratio of its D-peak intensity $I_D$ to its G-peak intensity $I_G$, an R value ($I_D/I_G$), of 0.15 or smaller; and (b) having a full width at half maximum of the G peak, $\Delta v_G$, of 23 cm$^{-1}$ or smaller. The secondary battery has a capacity retention rate of 70% or greater when subjected to 500 cycles of charging and discharging at a constant current rate of 2 C at 60° C.

7 Claims, 3 Drawing Sheets

LITHIUM ION SECONDARY BATTERY

TECHNICAL FIELD

The present invention relates to a lithium-ion secondary battery. In particular, it relates to a lithium-ion secondary battery suitable for use as an electric power source, etc., for vehicles.

BACKGROUND ART

A lithium-ion secondary battery comprises a positive electrode, a negative electrode, and an electrolyte present between these two electrodes; and charging and discharging are mediated by lithium ions in the electrolyte moving back and forth between the two electrodes. Its negative electrode comprises a negative electrode active material that is able to reversely store and release lithium ions. As such a negative electrode active material, various carbon materials are mainly used. Technical literatures relating to negative electrode materials for lithium-ion secondary batteries include Patent Documents 1 to 5.

CITATION LIST

Patent Literatures

[Patent Document 1] Japanese Patent Application Publication No. 2007-95402
[Patent Document 2] Japanese Patent Application Publication No. 2002-313321
[Patent Document 3] Japanese Patent Application Publication No. 2004-63321
[Patent Document 4] Japanese Patent Application Publication No. 2009-129769
[Patent Document 5] Japanese Patent Application Publication No. H7-235294

SUMMARY OF INVENTION

Technical Problem

As a general negative electrode active material, a graphitic material is mainly used. Graphite has a layered crystal structure in which charging and discharging are achieved by adsorption (insertion) and desorption (extraction) of lithium ions into and from the spaces between layers (interlayers). Thus, from the standpoint of increasing the transfer rate of lithium ions between the two electrodes by facilitating the access of lithium ions to the interlayers, investigations are underway to use a graphitic material having a higher edge face (edges of layers (including broken areas of layers) constituting a crystal) content (which hereinafter may be referred to as an edge face ratio) in the graphite particle surfaces. In a graphitic material having a higher edge face ratio, edges to serve as entrances and exits for lithium ions are largely exposed on the particle surfaces, and thus as compared to a graphitic material having a lower edge face ratio, the capacity per unit weight is expected to be greater. A lithium-ion secondary battery using a graphitic material having a high per-unit-weight capacity as the negative electrode active material may have a greater capacity density (i.e., it may have a high capacity for its physical size).

According to the investigations by the present inventors, however, lithium-ion secondary batteries constituted with a graphitic material having a higher edge face ratio as the negative electrode active material were found to suffer a significant decrease in the battery capacity (i.e., a low capacity retention rate) by repetitive cycles of charging and discharging. Even when a high capacity graphitic material is used as the negative electrode active material to constitute a battery with a high capacity density, if repetitive charging and discharging cause a significant capacity degradation, with the battery in actual use, the high capacity (initial capacity) inherent in the graphitic material would not be fully utilized after all. In particular, capacity retention rate is an important property in a lithium-ion secondary battery to be loaded on a vehicle (typically to be used as an electric power source for a vehicle, particularly as a vehicle-driving power source), with it being expected to undergo many cycles of charging and discharging including charging or discharging at a relatively high current.

One objective of the present invention is to provide a lithium-ion secondary battery (e.g., a lithium-ion secondary battery as a vehicle-driving power source) that uses a graphitic material having a high initial capacity (which can be considered as an initial weight specific energy) as a negative electrode active material and also has a great capacity retention rate.

Solution to Problem

The present invention provides a lithium-ion secondary battery comprising a positive electrode comprising a positive electrode active material, a negative electrode comprising a negative electrode active material, and a non-aqueous liquid electrolyte. The negative electrode active material comprises a material at least partially comprising a graphite structure (with the material being sometimes referred to as a "graphitic material" hereinafter). The graphitic material satisfies each of the following properties (a) and (b):
(a) in its Raman spectrum obtained by Raman scattering analysis using an exciting light at a wavelength of 532 nm, having a ratio of its D-peak intensity $I_D$ to its G-peak intensity to its G-peak intensity $I_G$, an R value $(I_D/I_G)$, of 0.15 or smaller.
(b) having a full width at half maximum of the G peak, $\Delta v_G$, of 23 cm$^{-1}$ or smaller.

When the lithium-ion secondary battery is subjected to 500 cycles of charging and discharging at a constant current rate of 2 C at 60° C., it exhibits a capacity retention rate of 70% or greater.

Herein, the D peak refers to a Raman peak that appears around 1360 cm$^{-1}$ and the G peak refers to a Raman peak that appears around 1580 cm$^{-1}$. As the intensities of the respective peaks, peak-top values (maximum intensities) are used as is, respectively. The half width at half maximum of the G peak, $\Delta v_G$, refers to a G-peak width across where the intensity is half of the peak top.

Because a graphitic material that satisfies the (a) and (b) is used as a negative electrode active material, such a lithium-ion secondary battery may have a high capacity density (initial capacity density) at the beginning of its use, and may be even less susceptible to capacity degradation (with it being of high durability). With a graphitic material that satisfies at least one of that the (a) is 0.10 or smaller (especially, 0.08 or smaller) and that the (b) is 20 cm$^{-1}$ or smaller, better results may be obtained. In a lithium-ion secondary battery that uses an olivine lithium-containing compound as the positive electrode active material, it is particularly advantageous to use a graphitic material that satisfies the (a) and (b) disclosed herein.

In the lithium-ion secondary battery disclosed herein, it is preferable that the graphitic material has an initial capacity of 300 mAh/g or higher (property (c)). Such a lithium-ion secondary battery may have a high initial capacity density (i.e., have a high capacity for its physical size) because it uses a graphitic material having a high initial capacity as a negative electrode active material. In addition, since it meets the capacity retention rate described earlier, even if it is used repeatedly in an embodiment subjected to charging or discharging at a relatively high current, it can better maintain the high initial capacity density.

As described above, because the lithium-ion secondary battery disclosed herein may have a high initial capacity density as well as an excellent capacity retention rate, it is preferable, for instance, as an electric power source used for driving a vehicle. Thus, as shown in FIG. 3 for example, the present invention provides a vehicle 1 comprising a lithium-ion secondary battery 100 disclosed herein. Especially preferable is a vehicle (e.g., an automobile) comprising such a lithium-ion secondary battery as a power source for driving the vehicle (typically, a power source of a hybrid vehicle or an electric vehicle).

DESCRIPTION OF EMBODIMENTS

Figure 1:
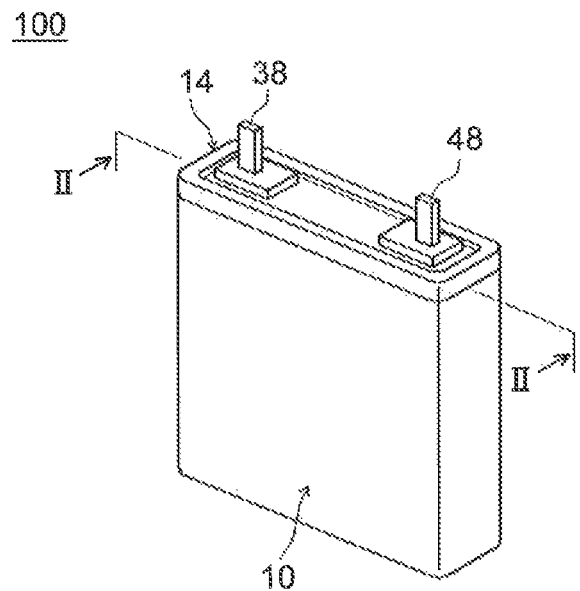
FIG. 1 shows a perspective view schematically illustrating the shape of a lithium-ion secondary battery according to one embodiment.

Preferred embodiments of the present invention are described below. Matters necessary to practice this invention other than those specifically referred to in this description may be understood as design matters to a person of ordinary skills in the art based on the conventional art in the pertinent field. The present invention can be practiced based on the contents disclosed in this description and common technical knowledge in the subject field.

The lithium-ion secondary battery disclosed herein comprises, as its negative electrode active material, one, two or more kinds of graphitic material having a R value of 0.15 or smaller (property (a)) as well as a $\Delta v_G$ value of 23 cm$^{-1}$ or smaller (property (b)). The R value is preferably smaller than 0.15, or more preferably 0.10 or smaller (e.g., 0.08 or smaller). Too large an R value tends to result in a more significant decrease in the capacity retention rate. The lower limit of the R value is not particularly limited. For example, a graphitic material having a R value of 0.05 or greater can be used, and usually, use of a graphitic material having a R value of 0.06 or greater is preferable. The $\Delta v_G$ value is preferably 21 cm$^{-1}$ or smaller, or more preferably 20 cm$^{-1}$ or smaller. When the $\Delta v_G$ value is too large, the initial capacity of the graphitic material may not be sufficient. The lower limit of the $\Delta v_G$ value is not particularly limited. For example, a graphitic material having a $\Delta v_G$ value of 15 cm$^{-1}$ or greater can be used, and usually use of a graphitic material having a $\Delta v_G$ value of 18 cm$^{-1}$ or greater is preferable.

As such a graphitic material, can be used various kinds of graphite (which may be either a synthetic graphite or a natural graphite) that satisfies the properties (a) and (b). For instance, can be preferably used a synthetic graphite obtainable by graphitization of a carbon material such as petroleum coke, coal, or the like. An especially preferably example of a carbon material is petroleum coke. The synthetic graphite is a carbon material with a carbon content of preferably 95% by mass or greater, or more preferably 98% by mass or greater. Graphitization of a carbon material can be carried out in accordance with a conventionally known method. For instance, under a non-oxidative atmosphere, calcination can be carried out at about 1200° C. to 1500° C. for about two to three hours, and after this, final baking can be performed at a higher temperature for about one hour or longer (e.g., about 1 to 6 hours). The temperature of the final baking is preferable to be approximately above 2200° C., but below 3000° C. Typically, it can be about 2300° C. to 2600° C. When the temperature of the final baking is too high or too low, at least one of the R value and the $\Delta v_G$ value is likely to turn out to be a undesirable value whereby at least one of the initial capacity and the capacity retention rate may turn out to be low.

The graphitic material preferably has a median diameter (D50) of about 5 μm to 20 μm in its particle size distribution. When the median diameter is too large, because it takes time for lithium ions to diffuse into the particle cores, etc., the actual capacity of the negative electrode may tend to decrease. When the median diameter is too small, due to enlargement of the specific surface area, etc., the rates of side reactions on the graphite particle surfaces may increase and the irreversible capacity of the battery may become larger. To obtain a desirable median diameter, classification process (sieving etc.) can be performed based on a conventionally known method.

The Raman scattering analysis to determine the R value and the $\Delta v_G$ value of the graphitic material can be carried out with an exciting light at a wavelength of 532 nm in an environment at 25° C., using a general Raman scattering system. As the Raman scattering system, can be preferably used, for instance, model number "NRS-1000" available from JASCO Corporation or a similar product. The output of the excitation light can be about 100 mW. The scattering analysis is preferably carried out at a resolution of about 15 cm$^{-1}$ to 25 cm$^{-1}$. For the Raman scattering analysis, a sample can be subjected to five or more runs (preferably 10 or more runs, e.g., 20 or more runs, typically) of measurement while changing the analyzed part within the same sample; the R values and the $\Delta v_G$ value can be calculated with respect to the respective measurement results; and the average values thereof can be used as the R value and the $\Delta v_G$ value of the sample.

In the art disclosed herein, can be preferably used a gaphitic material that satisfies the properties (a) and (b) and also has an initial capacity of 300 mAh/g or greater. In particular, a graphitic material having an initial capacity of 310 mAh/g or greater is preferable, or a graphitic material having an initial capacity of 320 mAh/g or greater (or even 330 mAh/g or greater) is more preferable. A graphitic material having such an initial capacity is suitable for constituting a battery with a high initial capacity density, with it being used as a negative electrode active material. A lithium-ion secondary battery using such a graphitic material as a negative electrode active material exhibits not only an excellent capacity retention rate, but also a high initial capacity density; and therefore, it is preferable as a battery used in a field requiring a high capacity power source (e.g., vehicles such as hybrid vehicles, electric automobiles, etc., and so on). Herein, the initial capacity of a graphitic material means the quantity of electricity that can be stored per unit mass of the graphitic material, and it refers to a value measured with a half cell where a negative electrode comprising a negative electrode active material formed of the graphitic material serves as the working electrode and lithium metal serves as the counter electrode. In particular, a value obtained in accordance with the method for measuring the initial capacity of a graphitic material shown in the examples described later can be used as the initial capacity of a graphitic material in the present invention.

A preferable graphitic material in the art disclosed herein exhibits a charge/discharge efficiency of 90% or greater or more preferably 92% or greater, when measured with the same half cell in accordance with the method described in the examples shown later. With use of such a graphitic material as a negative electrode active material, a higher performance lithium-ion secondary battery can be obtained.

Although it is not to limit the scope of the present invention, the reasons for the preferable results obtained with use of a graphitic material that satisfies the (a) and (b) may be considered such as follows.

At edge faces of graphite particles, side reactions such as reductive decomposition reactions of electrolyte components (non-aqueous solvent, supporting salt, etc.) are likely to happen. It is considered that development of such side reactions to some degree is beneficial for forming, on the negative electrode surface, a SEI (Solid Electrolyte Interphase) film made of the reductive decomposition products and increasing the stability of the negative electrode. However, depending on the configuration of the lithium-ion secondary battery or its usage, as charging and discharging are repeated, the SEI film builds up; and as a result, the SEI film may happen to become excessively thick (greatly exceeding the level desired for stabilizing the negative electrode). It is considered that this increases the amount of lithium ions consumed formation of the SEI film (lithium ions that are fixed in the SEI film and are incapable of moving between the two electrodes) whereby the battery capacity significantly decreases (the capacity retention rate decreases). A negative electrode using a graphitic material having a high edge face ratio is more susceptible to development of a build up of a SEI film. It is considered that especially when a battery formed with such a negative electrode is used or stored under a high temperature (e.g., about 40° C. to 60° C.) condition, or used in an embodiment where it is subjected to many cycles of charging and discharging including charging or discharging at a relatively high current, the SEI film builds up excessively, thereby significantly decreasing the capacity retention rate.

In the art disclosed herein, the edge face ratio is defined by the D-peak intensity $I_D$ to the G-peak intensity $I_G$ ratio, $(I_D/I_G)$, in the Raman spectrum, that is, by the R value. The D peak appears due to vibrations of poorly continuous (conjugated) $sp^2C$-$sp^2C$ bonds and corresponds primarily to edge faces (edges and broken areas in the layered crystal structure; i.e., areas of low crystallinity) of graphite particles. On the other hand, the G peak appears due to highly continuous $sp^2C$-$sp^2C$ bonds and corresponds to basal planes (network planes of graphene sheets formed of hexagonal nets of conjugated $sp^2C$'s; i.e., areas of high crystallinity). Therefore, through the R value, the edge face ratio in the graphite particle surfaces can be adequately figured out.

On the other hand, because the edge faces of graphite particles function for lithium ions as entrances and exits into and from the interlayers as well, a graphitic material having a small edge face ratio is likely to result in a low capacity density. Thus, by simply focusing on the R value alone of a graphitic material, it is difficult to combine a capacity retention rate and capacity density at high levels in a battery using the graphitic material as a negative electrode active material.

According to the art disclosed herein, a graphitic material having a R value equal to or smaller than a prescribed value (property (a)) as well as having a G-peak full width at half maximum value, $\Delta v_G$, equal to or smaller than a prescribed value (property (b)) is selected for use.

Herein, the $\Delta v_G$ value, which is the full width at half maximum of the G peak, corresponds to basal planes. Since Raman scattering analysis usually extends from the surface of a particle to a submicron depth range therein, it can be used as an index for measuring the degree of graphitization in the surface layers which are more greatly involved in insertion of lithium ions, in the graphite particles. For instance, when the G peak is sharp and its full width at half maximum is small, the degree of graphitization is considered high. When graphene sheets are stacked in such an embodiment, the amount of lithium that can be inserted into the graphite increases (when a maximum amount of Li is inserted, the structural formula of the graphite approaches $LiC_6$ (theoretical number) more closely). In other words, as the degree of graphitization increases and the $\Delta v_G$ value decreases, the amount of lithium ions that can be stored in the graphitic material increases, whereby the initial capacity of the graphitic material (and even the initial capacity of the negative electrode formed with the graphitic material as a negative electrode active material) may increase.

According to the art disclosed herein, because the R value of the graphitic material as a negative electrode active material is within the above-mentioned range, consumption of lithium ions by side reactions in the negative electrode may be suppressed and repetitive cycles of charging and discharging may result in a smaller capacity reduction. In addition, because the $\Delta v_G$ value is within the above-mentioned range, a sufficient initial capacity can be obtained and the decrease in the battery properties (e.g., output power, etc.) resulted from the negative electrode properties may be suppressed.

The present invention provides a lithium-ion secondary battery characterized by comprising a negative electrode containing a graphitic material disclosed herein. An embodiment of such a lithium-ion secondary battery is described in detail with an example of a lithium-ion secondary battery 100 (FIG. 1) having a configuration where an electrode body and a non-aqueous liquid electrolyte are placed in a square battery case while the art disclosed herein is not limited to such an embodiment. In other words, the shape of the lithium-ion secondary battery disclosed herein is not particularly limited, and the materials, shapes, sizes, etc., of components such as the battery case, electrode body etc., can be suitably selected in accordance with it intended use and capacity. For example, the battery case may have a cubic, flattened, cylindrical, or other shape. In the following drawings, all members and sites providing the same effect are indicated by the same reference numerals, and redundant descriptions may be omitted or abbreviated. Moreover, the dimensional relationships (of length, width, thickness, etc.) in each drawing do not represent actual dimensional relationships.

Figure 2:
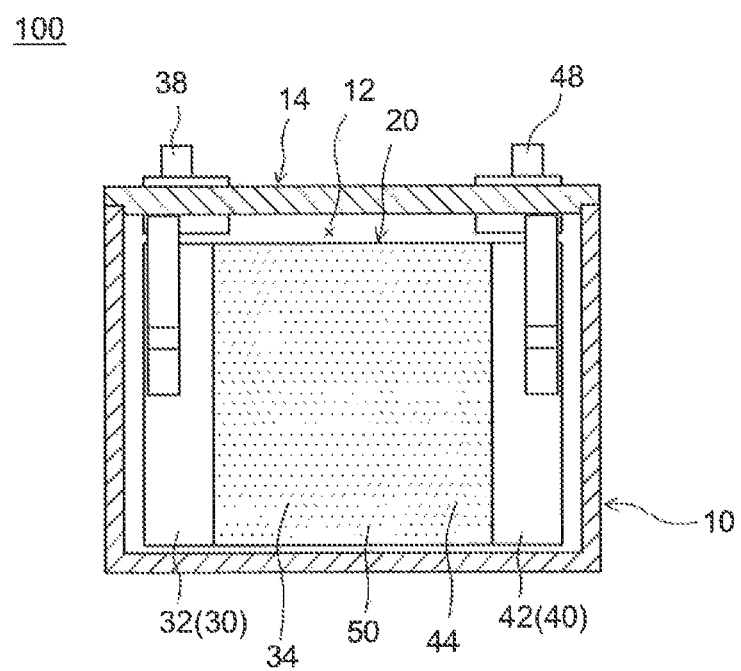
FIG. 2 shows a cross-sectional view taken along the line II-II in FIG. 1.
Figure 3:
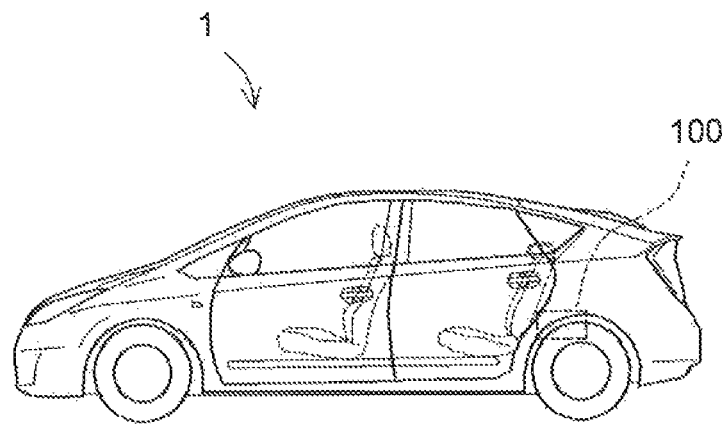
FIG. 3 shows a side view schematically illustrating a vehicle (an automobile) comprising a lithium-ion secondary battery according to the present invention.

As shown in FIG. 1 and FIG. 2, a lithium-ion secondary battery 100 can be constructed by placing a wound electrode body 20 along with a liquid electrolyte not shown in the drawing via an opening 12 into a flat box-shaped battery case 10 suitable for the shape of the electrode body 20, and closing the opening 12 of the case 10 with a lid 14. The lid 14 has a positive terminal 38 and a negative terminal 48 for connection to the outside, with the terminals partially extending out from the surface of the lid 14.

The electrode body 20 is formed into a flattened shape by overlaying and winding up a positive electrode sheet 30 in which a positive electrode active material layer 34 is formed on the surface of a long sheet of a positive current collector 32 and a negative electrode sheet 40 in which a negative electrode active material layer 44 is formed on a long sheet of a negative current collector 42 along with two long sheets of separators 50, and laterally compressing the resulting wound body.

The positive electrode sheet 30 is formed to expose the positive current collector 32 on an edge along the sheet length direction. In other words, the positive electrode active material layer 34 is not provided or has been removed after formed at the edge. Similarly, the negative electrode sheet 40 to be wound is formed to expose the negative current collector 42 on an edge along the sheet length direction. The positive terminal 38 is joined to the exposed edge of the positive current collector 32 and the negative terminal 48 is joined to the exposed edge of the negative current collector 42, respectively, to form electrical connections with the positive electrode sheet 30 and the negative electrode sheet 40 of the flattened wound electrode body 20. The positive and negative terminals 38 and 48 can be joined to their respective positive and negative current collectors 32 and 42, for example, by ultrasonic welding, resistance welding, and so on.

The negative electrode active material layer 44 can be formed, for instance, by applying to the negative current collector 42 a paste or slurry composition (negative electrode material mixture) obtained by dispersing in a suitable solvent a negative electrode active material comprising a graphitic material disclosed herein as well as a binder, etc., and drying the applied composition. As the negative electrode active material, a graphitic material that satisfies the properties (a) and (b) (preferably; a graphitic material that further satisfies the property (c)) can be used essentially alone, or the graphitic material can be used along with other negative electrode active materials (e.g., one, two or more kinds selected from graphitic materials that do not satisfy one or either of the properties (a) and (b), soft carbons, hard carbons, mesophase carbon microbeads and so on). In a preferable embodiment, is used a negative electrode active material comprising as its primary component (typically, a component accounting for 50% by mass or greater of the negative electrode material) a graphitic material that satisfies the properties (a) and (b) (preferably also the property (c)). Usually, it is preferable to use a negative electrode active material comprising 70% by mass or greater (more preferably 85% by mass or greater, typically 95% by mass or greater) of the graphitic material. For example, can be preferably used a negative electrode active material consisting essentially of the graphitic material.

The amount of the negative electrode active material contained in the negative electrode active material layer is not particularly limited. For example, it can be about 90 to 99% by mass.

As the binder, a suitable one can be selected for use from various polymers. One kind can be used solely, or two or more kinds can be used in combination.

Examples include water-soluble polymers such as carboxymethyl cellulose (CMC), methyl cellulose (MC), cellulose acetate phthalate (CAP), hydroxypropyl methylcellulose (HPMC), hydroxypropyl methylcellulose phthalate (HP-MCP), polyvinyl alcohols (PVA), etc.; water-dispersible polymers such as fluorine containing resins such as polytetrafluoroethylene (PTFE), tetrafluoroethylene-perfluoroalkyl vinyl ether copolymers (PFA), tetrafluoroethylene-hexafluoropropylene copolymers (FEP), ethylene-tetrafluoroethylene copolymers (ETFE), etc., vinyl acetate polymers, styrene-butadiene block copolymers (SBR), acrylic acid-modified SBR resins (SBR-based latexes), rubbers (gum arabic, etc.), etc.; oil-soluble polymers such as polyvinylidene fluoride (PVDF), polyvinylidene chloride (PVDC), polyethylene oxide (PEO), polypropylene oxide (PPO), polyethylene oxide-propylene oxide copolymers (PEO-PPO), etc.; and so on.

The amount of the binder added can be suitably selected in accordance with the type and amount of the negative electrode active material. For example, it can be about 1 to 10% by mass of the negative electrode active material layer.

As the negative current collector 42, can be preferably used a conductive material formed of a metal having good conductivity. For instance, copper or an alloy containing copper as the primary component can be used. The shape of the negative current collector 42 is not particularly limited as it may vary in accordance with the shape, etc., of the lithium-ion secondary battery and it may have a variety of shapes such as a rod, plate, sheet, foil, mesh, and so on. In the present embodiment, a copper sheet is used as the negative current collector 42 and can be preferably used in a lithium-ion secondary battery 100 comprising a wound electrode body 20. In such an embodiment, for example, a copper sheet having a thickness of about 6 µm to 30 µm can be preferably used.

The positive electrode active material layer 34 can preferably be formed, for instance, by applying to the positive current collector 32 a paste or slurry composition (positive electrode material mixture) obtained by dispersing in a suitable solvent a positive electrode active material along with a conductive material, a binder, etc., as necessary, and by drying the composition. The amount of the positive electrode active material contained in the positive electrode material layer can be, for example, about 80 to 95% by mass.

As the positive electrode active material, a positive electrode material capable of storing and releasing lithium is used, and any substance conventionally used in a lithium-ion secondary battery can be used. For example, can be used a lithium-containing compound having an olivine crystal structure, a lithium-containing composite oxide having a layered rock salt structure or a spinel crystal structure, and so on. Of these positive electrode active materials, one kind can be used solely, or two or more kinds can be used in combination.

Examples of an especially preferable positive electrode active material include an olivine lithium-containing compound. A positive electrode active material consisting essentially of an olivine lithium-containing compound can be used as well. Examples of the olivine lithium-containing compound include olivine compounds represented by general formula: $LiMPO_4$. Herein, M is at least one kind selected from a group consisting of Fe, Co, Mn, and Ni. Examples of such an olivine compound include $LiFePO_4$, $LiFe_xMn_{1-x}PO_4$, $LiMnPO_4$, $LiM_x^1M_{1-x}^2PO_4$ (wherein $M_1$ and $M_2$ are one, two or more kinds selected from Fe, Co, Mn, and Ni, respectively) and so on. An example of an especially preferable olivine compound is $LiFePO_4$.

A positive electrode using an olivine compound gives rise to relatively flat voltage curves when charged and discharged. A negative electrode using a carbon material that is highly graphitized (i.e., having a small $\Delta v_G$ value) also gives rise to relatively flat voltage curves when charged and discharged. Therefore, with a lithium-ion secondary battery constructed with a combination of these positive electrode and negative electrode, the SOC (state of charge) range where the voltage stays almost constant when charged and discharged turn out to be broad. In other words, a lithium-ion secondary battery with stable input and output properties can be obtained. Also, according to the investigations by the present inventors, in a lithium-ion secondary battery using an olivine compound as a positive electrode active material, a reduction in the capacity is caused primarily from consumption of lithium ions due to a build up of a SEI film on the negative electrode surface, with the film being formed of reductive decomposition products of components of the liquid electrolyte, while increased internal resistance caused by the other reasons has a relatively small influence. Thus, in a lithium-ion secondary battery using an olivine lithium-containing compound as a positive electrode active material, the advantage of suppressing the R value to a prescribed value or below (suppression of a SEI film build up) is exerted more significantly.

Examples of the lithium-containing composite oxides include lithium-nickel-based composite oxides, lithium-cobalt-based composite oxides, lithium-manganese-based composite oxides, lithium-magnesium-based composite oxides, and the like. Herein, the scope of the lithium-nickel-based composite oxide encompasses oxides containing lithium (Li) and nickel (Ni) as constituent metal elements as well as oxides containing as constituent metal elements, in addition to lithium and nickel, at least one other kind of metal element (i.e., a transition metal element and/or a main group metal element other than Li and Ni) at a ratio roughly equal to or less than nickel (typically at a ratio less than nickel) based on the number of atoms. The metal element other than Li and Ni can be, for instance, one, two or more kinds of metal elements selected from a group consisting of cobalt (Co), aluminum (Al), manganese (Mn), chromium (Cr), iron (Fe), vanadium (V), magnesium (Mg), titanium (Ti), zirconium (Zr), niobium (Nb), molybdenum (Mo), tungsten (W), copper (Cu), zinc (Zn), gallium (Ga), indium (In), tin (Sn), lanthanum (La), and cerium (Ce). It is noted that the same applies also to the scopes of the lithium-cobalt-based composite oxide, the lithium-manganese-based composite oxide, and the lithium-magnesium-based composite oxide.

As the conductive material, can be preferably used a powdered conductive material such as carbon powder, carbon fibers, and so on. As the carbon powder, various kinds of carbon black such as acetylene black, furnace black, Ketjen black, graphite powder and the like are preferable. One kind of conductive material can be used solely, or two or more kinds can be used in combination.

The amount of the conductive material contained in the positive electrode active material layer may be suitably selected in accordance with the kind and amount of the positive electrode active material. For instance, it can be about 4 to 15% by mass.

As the binder, of those listed earlier for the negative electrode, one kind can be used solely, or two or more kinds can be used in combination. The amount of the binder added can be suitably selected in accordance with the kind and amount of the positive electrode active material. For instance, it can be about 1 to 5% by mass of the positive electrode active material layer.

As the positive current collector 32, can be preferably used a conductive material formed of a metal having good conductivity. For example, can be used aluminum or an alloy containing aluminum as the primary component. The shape of the positive current collector 32 is not particularly limited as it may vary in accordance with the shape, etc., of the lithium-ion secondary battery, and it may have a variety of shapes such as a rod, plate, sheet, foil, mesh, and so on. In the present embodiment, an aluminum sheet is used as the positive current collector 32 and can be preferably used in a lithium-ion secondary battery 100 comprising a wound electrode body 20. In such an embodiment, for example, an aluminum sheet having a thickness of about 10 µm to 30 µm can be preferably used.

The non-aqueous liquid electrolyte comprises a supporting salt in a non-aqueous solvent (organic solvent). As the supporting salt; a lithium salt used as a supporting salt in a general lithium-ion secondary battery can be suitably selected for use. Examples of such a lithium salt include $LiPF_6$, $LiBF_4$, $LiClO_4$, $LiAsF_6$, $Li(CF_3SO_2)_2N$, $LiCF_3SO_3$, and the like. One kind of such a supporting salt can be used solely, or two or more kinds can be used in combination. $LiPF_6$ can be given as an especially preferable example. It is preferable to prepare the non-aqueous liquid electrolyte to have a supporting salt concentration within a range of, for instance, 0.7 mol/L to 1.3 mol/L.

As the non-aqueous solvent, an organic solvent used in general lithium-ion secondary batteries can be suitably selected for use. Examples of especially preferable non-aqueous solvents include carbonates such as ethylene carbonate (EC), diethyl carbonate (DEC), dimethyl carbonate (DMC), ethyl methyl carbonate (EMC), vinylene carbonate (VC), propylene carbonate (PC), and so on. Of these organic solvents, one kind can be used solely, or two or more kinds can be used in combination. For example, a mixture of EC and EMC can be preferably used.

The separator 50 is a sheet placed between the positive electrode sheet 30 and the negative electrode 40 so as to be in contact with both the positive electrode active material layer 34 of the positive electrode sheet 30 and the negative electrode active material layer 44 of the negative electrode sheet 40. It functions to prevent a short circuit associated with direct contact between the two electrode active material layers 34 and 44 on the positive electrode sheet 30 and the negative electrode sheet 40. It also functions to form conductive paths (conductive pathways) between the electrodes, with the pores of the separator 50 having been impregnated with the liquid electrolyte. As such a separator 50, a conventional separator can be used without particular limitations. For example, a porous sheet of a resin (micro-porous resin sheet) can be preferably used. A porous sheet of a polyolefin resin such as polyethylene (PE), polypropylene (PP), or of a polystyrene, etc., is preferable. In particular, can be used preferably a PE sheet a PP sheet, a multi-layer sheet having overlaid PE and PP layers, or the like. The thickness of the separator is preferably set within a range of about 10 µm to 40 µm, for example.

Several embodiments relevant to the present invention are described below although this is not to limit the present invention to these embodiments. In the following explanation, the terms "parts" and "%" are based on the mass unless specifically stated otherwise.

Example 1

Graphitic Material

Petroleum coke (carbon ratio of 98%) was calcined at 1200° C. to 1500° C. for 2 to 3 hours in a nitrogen atmosphere. The resulting calcined coke was subjected to final baking to graphitize at 2500° C. for 3 hours. This was pulverized and sieved to obtain graphite A having a particle size distribution with a D50 of 12 µm.

[Negative Electrode Sheet]

Graphite A and PVDF (binder) were mixed at a mass ratio of 95:5 and dispersed in NMP to form a negative electrode material mixture of 48% NV (solid content). This negative electrode material mixture was applied to each face of a 10 µm thick copper foil, and after dried, the resultant was pressed with a roller to obtain a negative electrode sheet. The applied amount of the negative electrode material mixture was adjusted so that the total coating amount of both faces was 5 mg/cm² based on the solid content.

[2032 Cell]

Figure 5:
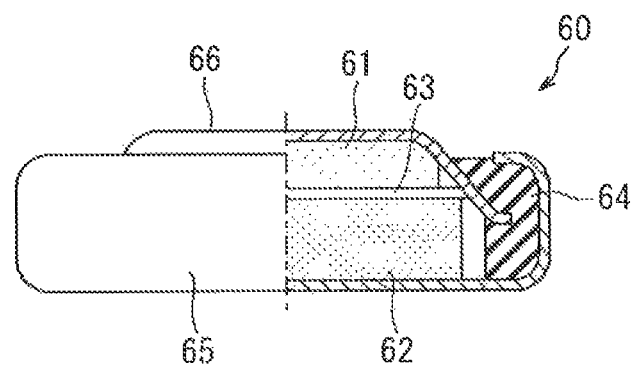
FIG. 5 shows a partial cross-sectional view schematically illustrating the shape of a 2032 lithium-ion battery.

From the negative electrode sheet, a circle of 16 mm diameter was punched out to constitute a cell for measuring the negative electrode capacity. As shown in FIG. 5, the negative electrode sheet, which was a working electrode 61, a lithium counter electrode 62 (lithium metal foil of 19 mm diameter, 0.15 mm thickness), a separator 63 (a porous polyethylene sheet of 22 mm diameter, 20 μm thickness) impregnated with a liquid electrolyte were placed into a stainless steel container 65 (counter electrode terminal), and the container was sealed with a gasket 64 and a lid 66 (working electrode terminal) to construct a 2032 cell 60 (cell for capacity measurement) of 20 mm diameter and 3.2 mm thickness. As the liquid electrolyte, was used a solution prepared by dissolving $LiPF_6$ to a concentration of 1 mol/L in a mixed solvent with a EC to EMC volume ratio of 3:7.

[Box-Shaped Battery]

Were mixed $LiFePO_4$ (olivine lithium-containing compound) as a positive electrode active material, acetylene black (conductive material), and PVDF (binder) so that their mass ratio was 85:5:10, and the mixture was dispersed in NMP to form a positive electrode material mixture of 50% NV. This positive electrode material mixture was applied to each face of a 15 μm thick aluminum foil, and after dried, the resultant was pressed with a roller to obtain a positive electrode sheet.

This positive electrode sheet and the negative electrode sheet obtained above were placed to face each other across a 20 μm thick porous polypropylene/polyethylene composite sheet. The resultant was placed along with the liquid electrolyte in a 100 mL box-shaped container configured so that positive and negative terminals can be put out, and the container was sealed to construct a box-shaped battery.

In fabricating these batteries, assuming that the graphitic material contained in each negative electrode sheet would provide the theoretical capacity of graphite (372 mAh/g), the applied amounts of the two electrode material mixtures were adjusted so that the negative electrode sheet and the positive electrode sheet constructed in the following examples had a theoretical capacity ratio (theoretical capacity of negative electrode sheet:theoretical capacity of positive electrode) of 1.2:1.

Example 2

Except that the graphitizing temperature was set at 2400° C., in the same manner as Example 1, graphite B was obtained. Except that graphite B was used in place of graphite A, in the same manner as Example 1, was prepared a negative electrode sheet, and were constructed a 2032 cell and a box-shaped battery according to this example.

Example 3

Except that the graphitizing temperature was set at 2300° C., in the same manner as Example 1, graphite C was obtained. Except that graphite C was used in place of graphite A, in the same manner as Example 1, was prepared a negative electrode sheets and were constructed a 2032 cell an a box-shaped battery according to this example.

Example 4

Except that coal coke (carbon ratio of 98%) was used in place of the petroleum coke of Example 1 and the graphitizing temperature was set at 3000° C., in the same manner as Example 1, graphite D was obtained. Except that graphite D was used in place of graphite A, in the same manner as Example 1, was prepared a negative electrode sheet, and were constructed a 2032 cell and a box-shaped battery according to this example.

Example 5

Except that the graphitizing temperature was set at 2200° C., in the same manner as Example 1, graphite E was obtained. Except that graphite E was use in place of graphite A, in the same manner as Example 1, was prepared a negative electrode sheet, and were constructed a 2032 cell and a box-shaped battery according to this example.

Example 6

Except that the graphitizing temperature was set at 2000° C., in the same manner as Example 1, graphite F was obtained. Except that graphite F was used in place of graphite A, in the same manner as Example 1, was prepared a negative electrode sheet, and were constructed a 2032 cell and a box-shaped battery according to this example.

Example 7

Except that the graphitizing temperature was set at 1800° C., in the same manner as Example 1, graphite G was obtained. Except that graphite C was used in place of graphite A, in the same manner as Example 1, was prepared a negative electrode sheet, and were constructed a 2032 cell and a box-shaped battery according to this example.

Example 8

Except that the graphitizing temperature was set at 3500° C., in the same manner as Example 4, graphite H was obtained. Except that graphite H was used in place of graphite A, in the same manner as Example 1, was prepared a negative electrode sheet, and were constructed a 2032 cell and a box-shaped battery according to this example.

[Raman Scattering Analysis]

Raman scattering analysis was carried out on graphites A to H. In particular, using a laser Raman scattering system (model number "NRS-1000" available from JASCO Corporation), approximately 1 mg of each graphite sample was subjected to Raman scattering analysis at a wavelength of 532 nm and a laser output of 100 mV for a measurement time of 30 seconds. From the resulting Raman spectrum, were determined the R value and the full width at half maximum of the G peak $\Delta v_G$ ($cm^{-1}$). The measurement was performed 30 times while changing the analyzed part within the sane sample; with respect to the results of each measurement, the R value and the $\Delta v_G$ value were calculated; and their average values were used as the R value and the $\Delta v_G$ value of each sample. As for the $I_D$ values and $I_G$ values used for the calculation of the R values, analytical values obtained with the scattering system were used, respectively. Also for the $\Delta v_G$ values ($cm^{-1}$), analytical values obtained with the scattering system were used.

[Measurement of Initial Capacity of Graphitic Material]

Each 2032 cell of Examples 1 to 8 was subjected at a temperature of 25° C. to an operation (discharging) to insert Li into the working electrode (negative electrode sheet) at a rate (current) of 1 C until the voltage reached 0.02 V, and at the same time, the electric capacity (CC discharge capacity) was measured. Following this, at the same voltage, it was discharged until the current dropped to 0.02 C. After this, it was subjected to an operation (charging) to release Li at a rate of 1 C until the voltage reached 1.2 V, and at the same time, was measured the electric capacity (CC charge capacity; i.e., what corresponds to the discharge capacity in a lithium-ion secondary battery comprising the working electrode of each cell as the negative electrode). This CC charge capacity was divided by the mass of the graphitic material (herein, graphites A to H) contained in the negative electrode sheet to calculate the initial capacity (mAh/g) of each graphite. The percentage of the measured CC charge capacity to the CC discharge capacity was determined as the charge/discharge efficiency (%) of the graphitic material according to each example. "1 C" in this initial capacity measurement refers to an amount of current that allows charging to a full battery capacity (Ah) predicted from the theoretical capacity of graphite in one hour.

Figure 4:
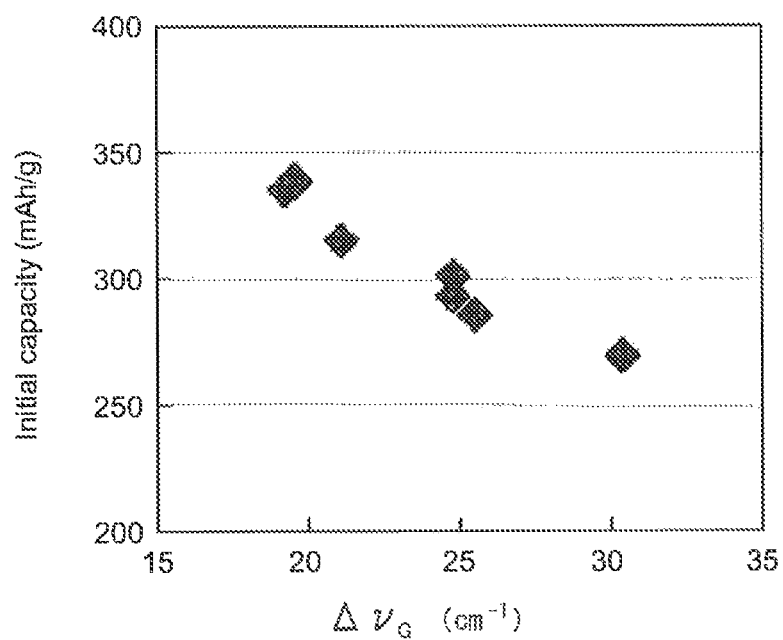
FIG. 4 shows a graph illustrating the relationship of the initial capacity to the $\Delta v_G$ value.

FIG. 4 shows a plot of the initial capacity of the graphitic materials against $\Delta v_G$.

[Initial Charging Treatment]

As initial charging treatment, each box-shaped battery of Examples 1 to 8 was charged at a constant current (CC) of ⅕ C (initial current) of the theoretical capacity of the positive electrode until the voltage across the two terminals reached 4.1 V followed by charging at the constant voltage (CV) until the current dropped to ¹⁄₁₀ of the initial current. Herein, 1 C refers to an amount of current that allows charging to a full battery capacity (Ah) predicted from the theoretical capacity of the positive electrode.

[Measurement of Capacity Retention Rate]

At a temperature of 60° C., each box-shaped battery of Examples 1 to 8 was CC-charged at a rate of 2 C until the voltage reached 4.1 V and after a 10 minute break, it was CC-discharged at the same rate to 2.5 V followed by a 10 minute break. With this charging/discharging cycle being counted as one cycle, 500 cycles of this were repeated. The discharge capacity of the first cycle was measured as the initial capacity of the battery. The discharge capacity of the 500th cycle was also measured, and the percentage thereof to the initial capacity was determined as the capacity retention rate.

With respect to the graphitic materials, 2032 cells, and box-shaped batteries according to Examples 1 to 8, the results of these analyses and measurements are shown in Table 1.

TABLE 1

| Example | Graphite | R value | $\Delta v_G$ (cm$^{-1}$) | Initial capacity (mAh/g) | Charge/discharge efficiency (%) | Capacity retention rate (%) |
|---|---|---|---|---|---|---|
| 1 | A | 0.073 | 19.6 | 339 | 93 | 92 |
| 2 | B | 0.075 | 19.6 | 338 | 93 | 87 |
| 3 | C | 0.121 | 21.2 | 315 | 92 | 83 |
| 4 | D | 0.137 | 30.3 | 270 | 92 | 76 |
| 5 | E | 0.145 | 24.8 | 301 | 92 | 72 |
| 6 | F | 0.160 | 24.8 | 293 | 91 | 40 |
| 7 | G | 0.187 | 25.5 | 286 | 91 | 26 |
| 8 | H | 0.205 | 19.3 | 335 | 91 | 41 |

As evident from Table 1, it was confirmed that the R value roughly corresponded to the capacity retention rate of a battery and as the R value increased, the capacity retention rate tended to decrease. However, the initial capacity of a negative electrode material mixture is weakly related to the R value. For example, of Examples 1 to 8, the graphitic material (graphite D) of Example 4 whose R value was near the median had the smallest initial capacity. The negative electrode of Example 8 having the largest R value showed an initial capacity almost equal to that of the graphitic material (graphite A) of Example 1 having the smallest R value. On the contrary, as shown in Table 1 and FIG. 4, it was confirmed that the $\Delta v_G$ value was strongly related to the initial capacity and there was a tendency that the smaller the $\Delta v_G$ value, the higher the initial capacity.

More particularly, the graphitic materials (graphites A, B, C) having a R value of 0.15 or smaller as well as a $\Delta v_G$ value of 23 cm$^{-1}$ or smaller all had an initial capacity significantly higher than 300 mAh/g and a relatively high charge/discharge efficiency. The batteries of Examples 1 to 3 formed with these graphitic materials as negative electrode active materials all showed high capacity retention rates after 500 cycles, with each rate being 80% or higher.

On the other hand, the graphitic materials (graphites D, E) having a R value of 0.15 or smaller, but having a $\Delta v_G$ value of 23 cm$^{-1}$ or greater exhibited an initial capacity that was clearly lower than those of the batteries of Examples 1 to 3. The batteries of Examples 4 and 5 formed with these graphitic materials showed a capacity retention rate lower by up to 20% than those of the batteries of Examples 1 to 3. The graphitic materials (graphites F, H) having a R value exceeding 0.15 as well as a $\Delta v_G$ value greater than 23 cm$^{-1}$ had a low initial capacity, which was in the vicinity of 290 mAh/g. The batteries of Examples 6 and 7 formed with these graphitic materials both showed a capacity retention rate substantially below 50%. In addition, the graphitic material (graphite H) having a R value exceeding 0.15, but having a $\Delta v_G$ value of 23 cm$^{-1}$ or smaller, had an initial capacity almost as high as those of Examples 1 and 2. However, the capacity retention rate of Example 8, which was formed with this graphitic material, showed a low capacity retention rate, which was half or less than half of those of Examples 1 and 2.

Although specific embodiments of the present invention have been described in detail above, these are merely for illustrations and do not limit the scope of the claims. The art according to the claims includes various modifications and changes of the specific embodiments illustrated above.

In addition, the matters disclosed in this description include the following:

(1) a lithium-ion secondary battery comprising a positive electrode comprising a positive electrode active material, a negative electrode comprising a negative electrode active material, and a non-aqueous liquid electrolyte, wherein the negative electrode active material comprises a graphitic material that satisfies each of the following properties:

(a) in its Raman spectrum obtained by Raman scattering analysis using an exciting light at a wavelength of 532 nm, having a ratio of its D-peak intensity $I_D$ to its G-peak intensity $I_G$, an R value ($I_D/I_G$), of 0.15 or smaller; and (b) having a full width at half maximum of the G peak, $\Delta v_G$, of 23 cm$^{-1}$ or smaller.

(2) the lithium-ion secondary battery according to the (1) above, comprising an olivine lithium-containing compound as the positive electrode active material.

(3) the lithium-ion secondary battery according to the (1) or (2) above, wherein, of the graphitic material, the R value is 0.10 or smaller and the $\Delta v_G$ value is 20 cm$^{-1}$ or smaller.

(4) the lithium-ion secondary battery according to any one of the (1) to (3) above, having a capacity retention rate of 70% or greater when subjected to 500 cycles of charging and discharging at a constant rate of 2 C at 60° C.

REFERENCE SIGNS LIST 1 vehicle
20 wound electrode body 30 positive electrode sheet
32 positive current collector
34 positive electrode active material layer
38 positive terminal
40 negative electrode sheet
42 negative current collector
44 negative electrode active material layer
48 negative terminal
50 separator
100 lithium-ion secondary battery

The invention claimed is:

1. A lithium-ion secondary battery comprising:
a positive electrode comprising a positive electrode active material;
a negative electrode comprising a negative electrode active material; and
a non-aqueous liquid electrolyte, and
wherein the negative electrode active material comprises as its primary component a graphitic material that satisfies each of the following properties:
(a) in its Raman spectrum obtained by Raman scattering analysis using an exciting light at a wavelength of 532 nm, having a ratio of its D-peak intensity $I_D$ to its G-peak intensity $I_G$, an R value ($I_D/I_G$), of 0.15 or smaller; and
(b) having a full width at half maximum of the G peak, $\Delta v_G$, of 23 cm$^{-1}$ or smaller; and
the lithium-ion secondary battery shows a capacity retention rate of 70% or greater when subjected at to 500 cycles of charging and discharging at a constant current rate of 2 C at 60° C., and
the positive electrode comprises an olivine lithium-containing compound.

2. The lithium-ion secondary battery according to claim 1, wherein the graphitic material satisfies the R value of 0.05 or greater and 0.10 or smaller and the $\Delta v_G$ value of 0.15 cm$^{-1}$ or greater and 20 cm$^{-1}$ or smaller.

3. The lithium-ion secondary battery according to claim 1, wherein the graphitic material further satisfies the following property:
(c) having an initial capacity of 300 mAh/g or higher.

4. The lithium-ion secondary battery according to claim 1, wherein the negative electrode active material consists of the graphitic material and the positive electrode active material consists of the olivine lithium-containing compound.

5. The lithium-ion secondary battery according to claim 1 that is used as a vehicle-driving power source.

6. The lithium-ion secondary battery according to claim 4, wherein the graphitic material satisfies the R value of 0.06 or greater and 0.08 or smaller and the $\Delta v_G$ value of 0.18 cm$^{-1}$ or greater and 20 cm$^{-1}$ or smaller.

7. The lithium-ion secondary battery according to claim 1, wherein the graphitic material is a synthetic graphite obtainable by graphitization of a petroleum coke, and
the synthetic graphite is one graphitized by, under a non-oxidative atmosphere, calcining at 1200° C. to 1500° C. for 2 to 3 hours, and then baking at above 2200° C. but below 3000° C. for 1 to 6 hours.

* * * * *